US008865014B2

(12) United States Patent
Guo et al.

(10) Patent No.: US 8,865,014 B2
(45) Date of Patent: Oct. 21, 2014

(54) FIRE EXTINGUISHING COMPOSITION GENERATING FIRE EXTINGUISHING SUBSTANCE BY HIGH TEMPERATURE SUBLIMATION

(75) Inventors: Hongbao Guo, Xi'an (CN); Honghong Liu, Xi'an (CN); Xiaoqing Zhao, Xi'an (CN)

(73) Assignee: XI'AN J&R Fire Fighting Equipment Co., Ltd., Shaanxi (CN)

( * ) Notice: Subject to any disclaimer, the term of this patent is extended or adjusted under 35 U.S.C. 154(b) by 0 days.

(21) Appl. No.: 13/824,142

(22) PCT Filed: Sep. 7, 2011

(86) PCT No.: PCT/CN2011/079424

§ 371 (c)(1), (2), (4) Date: Mar. 15, 2013

(87) PCT Pub. No.: WO2012/034490

PCT Pub. Date: Mar. 22, 2012

(65) Prior Publication Data

US 2013/0168593 A1 Jul. 4, 2013

(30) Foreign Application Priority Data

Sep. 16, 2010 (CN) .......................... 2010 1 0285513

(51) Int. Cl.

| | |
|---|---|
| ***A62D 1/06*** | (2006.01) |
| ***C09K 21/00*** | (2006.01) |
| ***A62D 1/00*** | (2006.01) |

(52) U.S. Cl.

CPC ................ *A62D 1/0092* (2013.01); *A62D 1/06* (2013.01)

USPC ............ 252/5; 252/4; 252/6; 252/7; 252/605; 169/44; 169/45; 169/46; 169/47

(58) Field of Classification Search

USPC ........ 252/4, 5, 6, 7, 605, 610; 169/44, 45, 46, 169/47

See application file for complete search history.

(56) References Cited

U.S. PATENT DOCUMENTS

| | | | | |
|---|---|---|---|---|
| 2,901,428 | A * | 8/1959 | Schulenburg ..................... | 252/7 |
| 3,017,348 | A * | 1/1962 | Schulenburg et al. ............ | 252/2 |
| 4,207,245 | A * | 6/1980 | Halbert ........................... | 556/28 |
| 5,055,208 | A * | 10/1991 | Stewart et al. .................... | 252/8 |
| 5,071,076 | A * | 12/1991 | Chagnon et al. ................ | 241/21 |
| 5,423,385 | A * | 6/1995 | Baratov et al. .................. | 169/46 |
| 5,466,386 | A * | 11/1995 | Stewart et al. .................. | 252/2 |
| 5,613,562 | A * | 3/1997 | Galbraith et al. ............... | 169/12 |
| 5,831,209 | A * | 11/1998 | Kozyrev et al. ................. | 149/21 |
| 6,042,664 | A * | 3/2000 | Kozyrev et al. ............ | 149/109.6 |
| 8,652,346 | B2 * | 2/2014 | Guo et al. ........................ | 252/5 |
| 2003/0197159 | A1 * | 10/2003 | Kinose et al. ................. | 252/609 |
| 2007/0018143 | A1 * | 1/2007 | Goossens ...................... | 252/609 |
| 2010/0179259 | A1 * | 7/2010 | Guo et al. ..................... | 524/105 |
| 2010/0187465 | A1 * | 7/2010 | Guo et al. ......................... | 252/5 |
| 2013/0175060 | A1 * | 7/2013 | Guo et al. ....................... | 169/46 |

FOREIGN PATENT DOCUMENTS

| | | | |
|---|---|---|---|
| CN | 1052880 | A | 7/1991 |
| CN | 1064818 | A | 9/1992 |
| CN | 1238226 | A | 12/1999 |
| CN | 1322580 | A | 11/2001 |
| CN | 1481266 | A | 3/2004 |
| CN | 1600391 | A | 3/2005 |
| CN | 1695750 | A | 11/2005 |
| CN | 1713935 | A | 12/2005 |
| CN | 101327364 | A | 12/2008 |
| CN | 201260858 | Y | 6/2009 |
| CN | 101822883 | A | 9/2010 |
| RU | 2076761 | C1 | 4/1997 |
| RU | 2091106 | C1 | 9/1997 |

OTHER PUBLICATIONS

International Search Report for PCT Application No. PCT/CN2011/079424, dated Dec. 15, 2011 (5 pages).

Written Opinion for PCT Application No. PCT/CN2011/079424, dated Dec. 15, 2011 (10 pages).

Office Action dated Oct. 9, 2013 for U.S. Appl. No. 13/824,103, filed Mar. 15, 2013 (14 pgs.).

Office Action dated Oct. 8, 2013 for U.S. Appl. No. 13/824,123, filed Mar. 15, 2013 (14 pgs.).

Linteries et al., "Flame Inhibition by Ferrocene and Blends of Inert and Catalytic Agents," Proceedings of the Combustion Institute, vol. 28, pp. 2965-2972, May 2000.

Linteries et al., "Flame Inhibition by Ferrocene, Along and with CO2 and CF3H," Halon Options Technical Working Conference, pp. 129-140, May 2000.

Shou et al., "Fire safety analysis of gas fire extinguishing system," 3 pgs., Jun. 2002.

"The Security Analysis of Gas Fire extinguishing System" (Fire Science and Technology 2002 21(5)) 4 pgs.

* cited by examiner

*Primary Examiner* — Joseph D Anthony

(74) *Attorney, Agent, or Firm* — Shumaker & Sieffert, P.A.

(57) ABSTRACT

The present invention relates to a fire extinguishing composition which generate fire extinguishing substance by high temperature sublimation; the fire extinguishing composition comprising a fire extinguishing material which, in a heating process, can sublimate and release a fire extinguishing substance with fire extinguishing properties; the content of the fire extinguishing material is at least 80 wt %. When the fire extinguishing composition is in use, a pyrotechnic agent as a heat source and a power source; and the purpose of fire extinguishing is achieved by: igniting the pyrotechnic agent, generating a large quantity of fire substance from the fire extinguishing composition in the use of high temperature produced by burning pyrotechnic agent, and the fire substance sprays out together with the pyrotechnic agent. When compared with traditional aerosol fire extinguishing systems, gas fire extinguishing systems and water type extinguishing systems, the present invention can provide a more efficient and safer fire extinguishing composition.

14 Claims, No Drawings

FIRE EXTINGUISHING COMPOSITION GENERATING FIRE EXTINGUISHING SUBSTANCE BY HIGH TEMPERATURE SUBLIMATION

TECHNICAL FIELD OF THE APPLICATION

The present invention relates to fire-fighting field, relating to a use of a fire extinguishing composition and a chemical fire extinguishing substance, and in particular to a fire extinguishing composition which can generate fire extinguishing substance by high temperature sublimation.

BACKGROUND OF THE INVENTION

Since the specific objectives of replacing the Halon fire extinguishing agent were proposed to member countries by The Canada Montreal Convention in 1987, all the countries of the world dedicated to the research of a new fire extinguishing technology; people make great efforts to research a fire extinguishing technology which has high fire extinguishing efficiency without any environment pollution.

The gas fire extinguishing systems, the powder fire extinguishing systems, the water type fire extinguishing systems and the like, which are environmentally friendly, are widely used as substitutes of the Halon fire extinguishing agent. The fire extinguishing mechanism of an inert gas fire extinguishing system, such as carbon dioxide, IG541 and the like, is mainly physical extinguishing, namely, a smothering extinguishing by reducing the oxygen concentration of a fire area. Such fire extinguishing method would threat the personal safety of workers. The powder fire extinguishing system implements fire extinguishing by the process that the powder spraying under the effect of pressurized gas contacts with the flame to generate the physical and chemical inhibition effect. The water spraying fire extinguishing system achieves the purpose of controlling the fire, inhibiting the fire and extinguishing the fire under triple functions of the water mist: cooling, smothering and isolating thermal radiation.

However, these fire extinguishing systems need to be stored under high pressure, not only the volume of these systems are larger, but also the risks of physical explosion during the storage process are higher; the document "The Security Analysis of Gas Fire extinguishing System" (Fire Science and Technology 2002 21 (5)) analyzes the risks of the gas fire extinguishing system, and enumerates the safety accidents of the storage pressure gas fire extinguishing system.

According to the research data, many foreign researchers carried out a large number of fire extinguishing substance researches, the Next Generation Fire Extinguishing Technology Project Group (NGP) of the Building and Fire Research Centre of the U.S. National Institute of Standards and Technology (NIST) publishes a lot of articles on this field. The group has researched the fire extinguishing capacity of the testing substances by making the testing substances act on the flame with carrier gas. The nitrogen, carbon dioxide or $CF_3H$ gas were used as carrier gas and the testing substances were heated by the carrier gases with high temperature. Wherein, some substances (such as the ferrocene) can sublimate under the effect of high temperature gas, and then can generate fire extinguishing substances which can obviously improve the fire extinguishing effectiveness of the carrier gas (Proceeding of the Combustion Institute, Volume 28, 2000/pp. 2965-2972, Flame inhibition by ferrocene and blends of inert and catalytic agents, Halon Options Technical Working Conference 2-4 May 2000, Flame inhibition by ferrocene, alone and with $CO_2$ and $CF_3H$).

In addition, the domestic Henan Polytechnic University published an article about sublimation and fire extinguishing of ferrocene and, a patent CN101327364A, namely, a ferrocene fire extinguishing test system.

However, the above researches are all based on the laboratory theoretical research merely, without being practically applied in fire extinguishers; meanwhile, the current research result shows that only the ferrocene can generate the fire extinguishing substances when it sublimates at high temperature, and other substances are not mentioned.

The existing aerosol fire extinguishing agent mainly includes the S type and K type fire extinguishing agents, by comprehensively analyzing the performance characteristics of the existing aerosol fire extinguishing agent, the disadvantages are mainly as follows: all the existing aerosol fire extinguishing agents release a large amount of gas and active particles during oxidation-reduction reaction, and achieve the chemical-physical synergetic fire extinguishing purpose through the chain scission reaction of the active particles and the coverage smothering of the large amount of gas. The aerosol fire extinguishing agent can release a large amount of heat while releasing the aerosol during the combustion reaction. In order to effectively decrease the temperature of device and aerosol, and to avoid the secondary fire, a cooling system needs to be mounted, which causes defects of complicated and heavy device structure, complicated technical process and high cost. Otherwise, a large number of active particles are inactivated as the existing of cooling system, and the fire extinguishing performance is greatly reduced.

SUMMARY OF THE INVENTION

Aiming at the current situations of the existing fire extinguishing devices, and in particular to the inherent defects of the aerosol fire extinguishing systems, the purpose of the present invention is to provide a fire extinguishing composition which is without high-pressure storage, safer and environment friendly, and has efficient fire extinguishing effectiveness.

The fire extinguishing composition of the present invention comprises a fire extinguishing material which can generate a fire extinguishing substance by sublimation at high temperature, wherein the content thereof is more than 80 wt %.

Except comprising the fire extinguishing material which is used as the main fire extinguishing material and can generate a fire extinguishing substance by sublimation at high temperature, the fire extinguishing composition of the present invention also can properly add various additives which are commonly used in the field.

The fire extinguishing composition which can generate fire extinguishing substance by high temperature sublimation of the present invention can simultaneously achieve the following effects: first, the fire extinguishing composition which are capable of generating the fire extinguishing substance by high temperature sublimation can generate a flame inhibition substance by sublimation at the moment of heating; this substance can extinguish the fire by the physical or chemical inhibition effect, or the physical and chemical synergistic flame inhibition effect; second, by the inhibition effect of the sublimation products, the fire extinguishing effectiveness of the fire extinguishing agent is further improved while reducing the re-combustion possibility of the fire source; third, the fire extinguishing composition can rapidly absorb heat and sublimate under high-temperature heating, so as to effectively and rapidly reduce the heat released by burning the pyrotechnic agent, to greatly reduce the temperature of the nozzle of the fire extinguishing device and the sprayed substances, to save the complicated cooling system of the fire extinguishing device, and also to eliminate the risks of generating the secondary fire; fourth, the fire extinguishing composition is easy to be processed and molded, and also can be independently used or matched with the physical coolant; fifth, the fire extinguishing composition has stable performance, and is easy to be stored for a long time; sixth, the fire extinguishing composition has low toxicity or non-toxicity, and it is environment friendly and has excellent performance.

The fire extinguishing composition which can generate fire extinguishing substance by high temperature sublimation of the present invention is described below in details.

The fire extinguishing composition of the present invention includes the fire extinguishing material which can generate the fire extinguishing substance by sublimation at high temperature, of which the content is more than 80 wt %.

The flame inhibition mechanism of the fire extinguishing composition generating fire extinguishing substance by high temperature sublimation is as follows:

the fire extinguishing composition can sublimated to be the gaseous substances with flame inhibition effect at high temperature; the gaseous fire extinguishing substances can react with one or more of O, OH, H free radicals which are necessary for the chain combustion reaction via the free radicals, so as to cut off the chain combustion reaction; and also can reduce the partial pressure of oxygen by physical effect to inhibit the flames, or can simultaneously implement the physical and chemical inhibition effect to realize the fire extinguishing effect together; and meanwhile, it can generate synergistic interaction with the pyrotechnic agent to further improve the fire extinguishing effectiveness of the fire extinguishing agent, and to greatly shorten the effective fire extinguishing time.

In order to guarantee the stable performance of the fire extinguishing composition under normal temperature and for long term storage, the melting point of the fire extinguishing material capable of generating fire extinguishing substances by high temperature sublimation is preferably more than 100 degrees centigrade, and the material can be: 2,4,6-tribromophenyl glycidyl ether, dimethyl 4-bromophthalate, pentabromodiphenyl benzyl bromide, 2,4,6-tribromophenyl maleimide, pentabromochlorocyclohexane, tri(2,3-dibromopropyl)iso-cyanuric acid ester, tetrachlorophthalic anhydride, hexachlorobenzene, hexachloroethane, melamine, cyanuric acid, red phosphorus, tin oxide, ammonium bromide, cobaltocene.

The fire extinguishing composition of the present invention also can add various additives as required, such as the stearate, graphite, combination solution of water soluble polymer or the mixture thereof, wherein the content of the additive is less than or equal to 20 wt %.

Each ingredient of the fire extinguishing composition of the present invention and the content thereof are preferably:

the fire extinguishing material: 80 wt % to 90 wt %, the additive: 10 wt % to 20 wt %.

The fire extinguishing composition of the present invention can be molded to be spherical, flake-like, strip-like, block-like and cellular shapes by using the techniques of pelleting, mould pressing, extruding and the like, and can be implemented with surface coating treatment. Hydroxymethyl cellulose or hydroxyethyl cellulose is preferably added as the surface coating agent when implementing the surface coating treatment. The surface coating agent can improve the surface finish of the composition, improve the intensity, abrasion resistance and shock resistance thereof, and prevent the phenomenon that the fire extinguishing composition is pulverized, dregs dropped, and overflows from the fire extinguishing device during the transportation process.

The fire extinguishing composition of the present invention is described more specifically below by the embodiments.

DETAILED DESCRIPTION OF THE EMBODIMENTS

Respectively adding 30 g of the fire extinguishing composition prepared by the fire extinguishing material and the additives in the following table into the fire extinguishing device which is filled with 20 g of the K type thermal aerosol generating agent, and respectively implementing a distributing fire extinguishing tests in a 1.0 $m^3$ test box; respectively testing 3 rounds for each group of samples, recording the fire extinguishing quantity and the residual quantity; the test result is as shown in Table 1.

The comparison embodiments are that: implementing a distributing fire extinguishing tests for the fire extinguishing device samples which are only respectively filled with 20 g commercial and normal S type aerosol fire extinguishing agent or K type aerosol fire extinguishing agent in the same 1.0 $m^3$ test box, respectively testing 3 rounds for each group of samples, recording the fire extinguishing quantity and the residual quantity, and the experimental test result is as shown in Table 1.

TABLE 1

Ingredient and test result comparison

| | | Ingredient content of experimental example (mass percent) | | | | | | | Comparison example | |
|---|---|---|---|---|---|---|---|---|---|---|
| | Ingredient | 1 | 2 | 3 | 4 | 5 | 6 | 7 | 1 | 2 |
| Fire extinguishing material | Commercial S type fire extinguishing agent | | | | | | | | ✓ | |
| | Commercial K type fire extinguishing agent | | | | | | | | | ✓ |
| | Pentabromodiphenyl benzyl bromide | 90 | | | | | 18 | | | |
| | Tetrachlorophthalic anhydride | | 70 | | | | | | | |
| | Hexachlorobenzene | | | 65 | | | | | | |
| | Melamine | | | | 82 | | | | | |
| | Red phosphorus | 5 | | | | 80 | | | | |
| | Tin dioxide | | 25 | | | | 72 | | | |

TABLE 1-continued

| Ingredient and test result comparison | | | | | | | | | | |
|---|---|---|---|---|---|---|---|---|---|---|
| Additive | Ammonium bromide | | | | 25 | | 16 | | 95 | |
| | Cobaltocene | | | | | 15 | | 5 | | |
| | Magnesium stearate | | 1.5 | | 4 | | | | | |
| | Zinc stearate | | | | | | | | | |
| | Graphite | 3 | 2 | | 2.5 | 1 | 2 | 1.5 | 2 | |
| | Hydroxypropyl methyl cellulose | | | | | | | | | |
| | Sodium silicate | | | | | | | | | |
| | Polyvinyl alcohol | | | | | | | | | |
| surface | Hydroxyethyl cellulose | 2 | 1.5 | | 3.5 | 2 | 2 | 3.5 | 3 | |
| Test result comparison | | | | | | | | | | |
| Fire extinguishing situations | | Four fire extinguished | Four fire extinguished | three fire extinguished | Four fire extinguished | three fire extinguished | Four fire extinguished | Four fire extinguished | Two fire extinguished | two fire extinguished |
| Residual quantity % | | 31.5 | 34.2 | 27.8 | 30.6 | 28.3 | 21.7 | 26.9 | 41.3 | 46.7 |

The fire extinguishing condition in the above table is the least fire extinguishing numbers of the three tests which are implemented, the residual quantity is the average value of the three experiences; from the test data in the above table, it can see that the fire extinguishing performances of the fire extinguishing compositions of the embodiments 1-7 of the present invention are all superior to the comparison embodiments 1 and 2 when implementing a distributing fire extinguishing test in the 1.0 $m^3$ test box, and the residual quantities are all smaller than the comparison embodiments 1 and 2.

The experimental method is based on the concentration distribution test method of 7.13 in GA 499-2004, the fire extinguishing test is implemented in the 1 $m^3$ test box; five steel-made test tanks are put in the test box; four fuel tanks which are staggered up and down in pairs are respectively put in four corners of the experimental space; in addition, a fuel tank is put at the bottom of the experimental space behind a baffle plate. N-heptane is filled in the fuel tank, and the bottom of the tank uses clear water as a cushion layer.

The above specific embodiments are only exemplary; under the above teachings of the present invention, those skilled in the art can implement various improvements and deformations on the basis of the above embodiments; and all the improvements or deformations shall fall within the protection scope of the present invention. Those skilled in the art should know that, the above specific descriptions are only used for explaining the purposes of the present invention, without limiting the present invention.

What is claimed is:

1. A fire extinguishing composition which generates fire extinguishing substance by high temperature sublimation, wherein the fire extinguishing composition comprises:
  a fire extinguishing material which can release a fire extinguishing substance with fire extinguishing properties by sublimation in a heating process, the content of the fire extinguishing material being at least 80 wt %; and
  a pyrotechnic agent,
  wherein the pyrotechnic agent of the fire extinguishing composition is adopted as a heat source and a power source in a process of fire extinguishing, and
  wherein fire extinguishing is achieved by:
    igniting the pyrotechnic agent,
    generating a large quantity of fire extinguishing substance from the fire extinguishing composition in the use of high temperature produced by burning pyrotechnic agent, and
    the fire extinguishing substance spraying out together with the pyrotechnic agent.

2. The fire extinguishing composition according to claim 1, wherein the fire extinguishing material is a composition which has a melting point of more than 100° C., and can generate the fire extinguishing substances by sublimation.

3. The fire extinguishing composition according to claim 1, wherein the pyrotechnic agent is a pyrotechnic aerosol fire extinguishing agent.

4. The fire extinguishing composition according to claim 1, wherein the fire extinguishing material is a bromine-based fire extinguishing material, a chlorine-based fire extinguishing material, a nitrogen-based and phosphorus-nitrogen based fire extinguishing material or an inorganic fire extinguishing material.

5. The fire extinguishing composition according to claim 4, wherein: the bromine-based fire extinguishing material is 2,4,6-tribromophenyl glycidyl ether, dimethyl 4-bromophthalate, pentabromodiphenyl benzyl bromide, 2,4,6-tribromophenyl maleimide or tri(2,3-dibromopropyl) iso-cyanuric acid ester.

6. The fire extinguishing composition according to claim 4, wherein the chlorine-based fire extinguishing material is tetrachlorophthalic anhydride, hexachlorobenzene or hexachloroethane.

7. The fire extinguishing composition according to claim 4, wherein the nitrogen-based and phosphorus-nitrogen based fire extinguishing material is melamine or cyanuric acid.

8. The fire extinguishing composition according to claim 4, wherein the inorganic fire extinguishing material is red phosphorus, tin oxide or ammonium bromide.

9. The fire extinguishing composition according to claim 1, wherein the fire extinguishing material is cobaltocene.

10. The fire extinguishing composition according to claim 1, wherein the fire extinguishing composition also includes an additive, of which the content is less than or equal to about 20 wt %.

11. The fire extinguishing composition according to claim 4, wherein the fire extinguishing composition also includes an additive, of which the content is less than or equal to about 20 wt %.

12. The fire extinguishing composition according to claim 10, wherein the additive is stearate, graphite, a combination solution of water soluble polymer or the mixture thereof.

13. The fire extinguishing composition according to claim 11, wherein ingredients of the fire extinguishing composition and the content thereof are:

the fire extinguishing material: 80 wt % to 90 wt %, the additive: 10 wt % to 20 wt %.

14. The fire extinguishing composition according to claim 1, wherein the fire extinguishing composition is implemented with the surface coating treatment.

* * * * *